3,203,973
PHOTODIMERIZATION OF FUMARONITRILE
Gary Walter Griffin, New Orleans, La., assignor to American Cyanamid Company, Stamford, Conn., a corporation of Maine
No Drawing. Original application Jan. 9, 1961, Ser. No. 81,224, now Patent No. 3,139,395, dated June 30, 1964. Divided and this application Mar. 12, 1964, Ser. No. 351,509
2 Claims. (Cl. 260—464)

The present application is a division of my parent application having the Serial No. 81,224, filed January 9, 1961, and entitled, Photodimerization of Fumaric Acid Derivatives, now U.S. Patent No. 3,139,395, issued June 30, 1964.

This invention relates to cis, trans, cis-1,2,3,4-tetracyanocyclobutane and to a process for the preparation thereof. Still further, this invention relates to the process for the preparation of cis, trans, cis-1,2,3,4-tetracyanocyclobutane comprising dimerizing fumaronitrile wherein the dimerization is accomplished by subjecting a solid state layer of fumaronitrile directly to light having a wave length between about 1750 A. and 4000 A.

One of the objects of the present invention is to produce cis, trans, cis-1,2,3,4-tetracyanocyclobutane. A further object of the present invention is to produce cis, trans, cis-1,2,3,4-tetracyanocyclobutane by dimerizing fumaronitrile by subjecting a solid state layer of fumaronitrile directly to light having a wave length between about 1750 A. and 4000 A. These and other objects of the present invention will be discussed in greater detail hereinbelow.

In the aforementioned subject application, a plurality of different processes are described which are analogous to the instant process but which are directed to different starting materials and different end products. For instance, one process comprises the dimerization of dimethyl fumarate to the tetramethyl ester of cis, trans, cis-1,2,3,4-cyclobutanetetracarboxylic acid. Still further, the parent application shows a process for dimerizing maleic anhydride under substantially the same conditions to produce the dianhydride of cis, trans, cis-1,2,3,4-cyclobutanetetracarboxylic acid. A novel feature of the present invention resides in the compound cis, trans,cis-1,2,3,4-tetracyanocyclobutane and to a process for preparing the same. This is analogous to the process described hereinabove in the dimerization of maleic anhydride and dimethyl fumarate inasmuch as one can by this process dimerize fumaronitrile by subjecting a solid state layer of fumaronitrile directly to light having a wave length between 1750 A. and 4000 A. to produce cis, trans, cis-1,2,3,4-tetracyanocyclobutane.

In order that the concept of the present invention may be more completely understood, the following example is set forth in which all parts are parts by weight unless otherwise indicated. This example is set forth primarily for the purpose of illustration and any specific enumeration of detail contained therein should not be interpreted as a limitation on the case except as is indicated in the appended claims.

*Example 1.—Preparation of cis, trans, cis-1,2,3,4-tetracyanocyclobutane*

60 parts of fumaronitrile are deposited on the inside wall of a glass cylinder by evaporating the solvent (diethyl ether) from the material. A Westinghouse 15T8 Germicidal Sterilamp is placed in the center of the tube and the outside of the cylinder is cooled with running water. The irradiation is continued for about 1 week and the resulting product, a brown residue is then scraped from the tube and extracted with hot ether to remove the starting material. The insoluble material amounting to 3.071 parts is recrystallized from dry acetonitrile yielding 2.1 parts (68% of converted nitrile, 3.5% over-all) of a white crystalline solid having a melting point of 250° C. dec. The product is identified as cis, trans, cis-1,2,3,4-tetracyanocyclobutane.

*Analysis.*—Calcd. for $C_8H_4N_4$: C., 61.53; H, 2.58; N, 35.88. Found: C, 61.38; H, 2.79; N, 35.88. The NMR spectrum shows only one peak, and the mass spectrograph does not show the parent mass, but shows a mass equivalent to that of the dimer less a molecule of HCN. The infrared spectrum is consistent with the dimeric structure as the carbon-hydrogen peak of the fumaronitrile has been shifted from $3.27\mu$ to $3.35\mu$ in the dimer, and the nitrile peak has been shifted from $4.48\mu$ to $4.44\mu$, which is compatible with the removal of unsaturation.

The tetracyano derivative of the present invention is useful in the production of guanamines, which can be accomplished by reacting said tetracyano compound with dicyandiamide. The guanamines thus produced are, in turn, reactive with aldehydes such as formaldehyde to produce aminoplast resinous compositions.

What is claimed is:
1. A process for the preparation of cis, trans, cis-1,2,3,4 - tetracyanocyclobutane comprising dimerizing fumaronitrile by subjecting a solid state layer of fumaronitrile directly to light having a wave length between about 1750 A. and 4000 A.
2. Cis, trans, cis-1,2,3,4-tetracyanocyclobutane.

References Cited by the Examiner
Griffin et al., Tetrahedron Letters, No. 3, pp. 13–16 (1960).

CHARLES B. PARKER, *Primary Examiner.*